March 20, 1956

J. BESTLAND ET AL 2,738,633

STONE GATHERING MACHINE HAVING
A TILTABLE SCOOP AND HOPPER

Filed Oct. 9, 1953

INVENTORS
JERGEN BESTLAND,
FLOYD W. VIEL,
BY

McMorrow, Berman + Davidson
ATTORNEYS.

March 20, 1956
J. BESTLAND ET AL
2,738,633
STONE GATHERING MACHINE HAVING
A TILTABLE SCOOP AND HOPPER
Filed Oct. 9, 1953
2 Sheets-Sheet 2
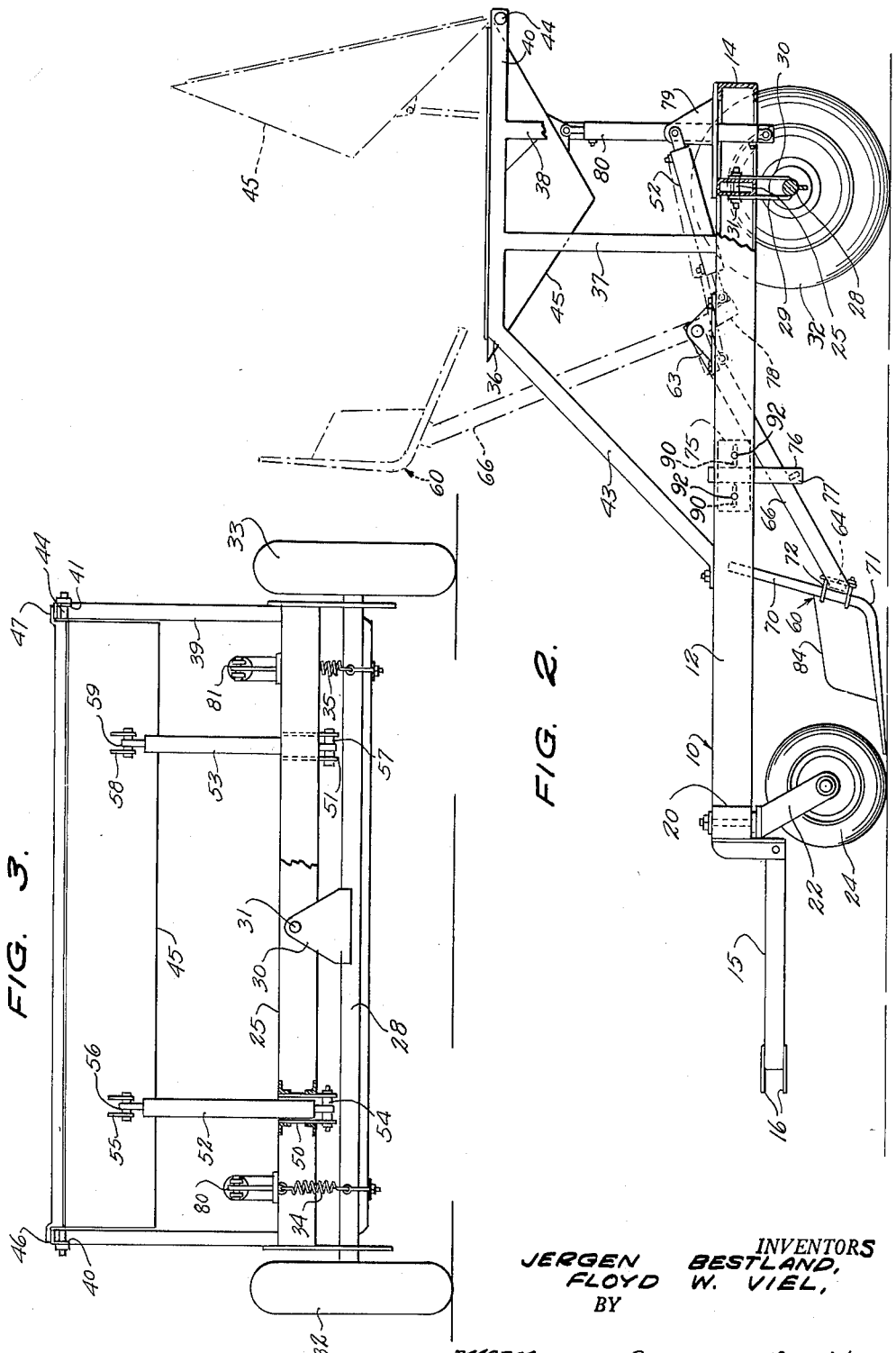
INVENTORS
JERGEN BESTLAND,
FLOYD W. VIEL,
BY
McMorrow, Berman & Davidson
ATTORNEYS.

United States Patent Office 2,738,633
Patented Mar. 20, 1956

2,738,633

STONE GATHERING MACHINE HAVING A TILTABLE SCOOP AND HOPPER

Jergen Bestland, Antelope, Mont., and Floyd W. Viel, Fargo, N. Dak.

Application October 9, 1953, Serial No. 385,083

5 Claims. (Cl. 55—17)

This invention relates to mobile stone gathering machines and more particularly to a machine for picking and gathering the small stones and pebbles that come to the surface in the cultivation of glaciated land.

It is the principal object of this invention to provide a stone gathering machine which can be pulled over land by an agricultural tractor and which is adapted to have a scoop assembly in engagement with the ground surface and a hopper disposed above and adjacent one end of the wheeled frame of the machine to receive the stones gathered by the scoop assembly as the scoop assembly is moved in a vertical arcuate path by the horizontal axes from its stone gathering to its stone dumping position above the hopper, and the hopper adapted for movement from its stone receiving position to a stone dumping position also above the frame of the stone gathering machine. Also, there is provided means whereby the depth to which the scoop assembly engages the ground surface may be selectively controlled. Hence, this invention contemplates a stone gathering machine which is particularly effective in dislodging and gathering stones and which may be transported readily from place to place and discharge a load of stones gathered thereby at a selected point, and which is of simple, yet rugged construction, requiring a minimum of maintenance over an extended period of time.

Other objects and advantages will become apparent from a consideration of the following description and the appended claims in conjunction with the accompanying drawings, wherein:

Figure 2 is a side elevational view of the stone gathering machine with parts broken away and shown in cross section to better illustrate the construction thereof, with the hopper and scoop assembly shown in broken lines in adjusted or elevated position; and Figure 3 is a rear elevational view of the machine.

Figure 1:
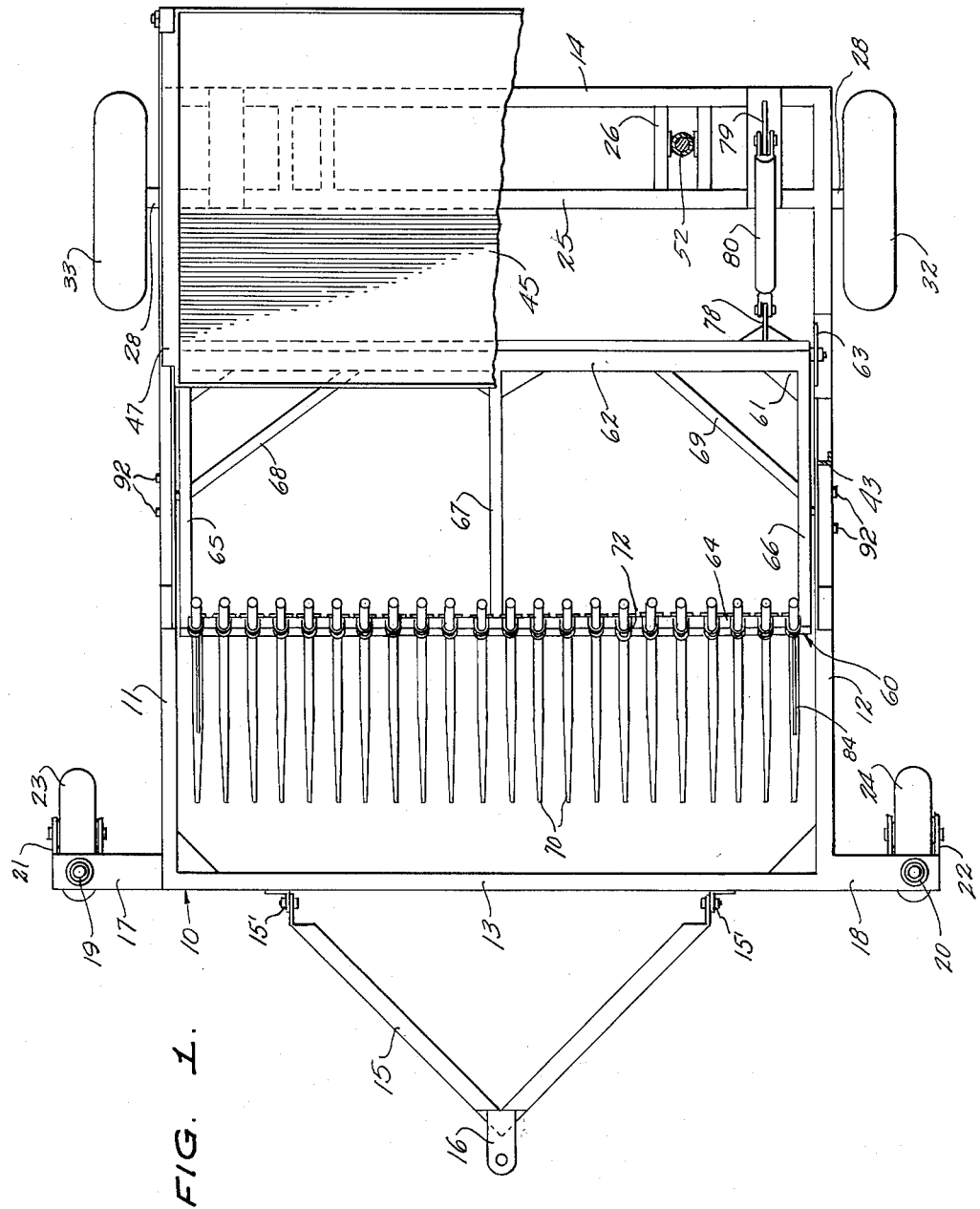
Figure 1 is a top plan view of a stone gathering machine illustrative of the invention with a portion of the machine broken away to better illustrate the construction thereof.

With continued reference to the drawings, the machine comprises a frame, generally indicated at 10, of rectangular shape having spaced apart and substantially parallel side members 11 and 12 and front and rear cross members 13 and 14 extending between and joined to the side members at the corresponding front and rear ends of the frame. A tongue 15 of triangular shape is pivotally connected at its base to the front cross member 13, as at 15′, symmetrically of the length of this cross member to move about an axis which lies parallel to the bar and carries at its apical front end an apertured lug 16 for connection to the hitch mechanism of an agricultural tractor.

Extensions 17 and 18 project laterally from opposite sides of the frame longitudinally of the front cross member 13 of the frame and carry at locations spaced from the frame vertically disposed bearing sleeves 19 and 20.

Caster wheel forks 21 and 22 are journaled at their upper ends in the sleeves 19 and 20 respectively and front caster wheels 23 and 24 are journaled in the forks 21 and 22 respectively for supporting the front end of the frame and providing for the steering of the machine.

An intermediate cross member 25 extends transversely of the frame and parallel and adjacent to the rear cross member 14 and is connected to the rear cross member by spaced apart struts, as indicated at 26, extending between the members 25 and 14 and disposed substantially perpendicular to these members. A rear axle 28 extends transversely of the frame below the intermediate cross member 25 and a pair of lugs 29 and 30 extend upwardly from the rear axle 28 at the mid-length location of the rear axle and in spaced apart and substantially parallel relationship to each other and have their upper portions disposed at the front and rear sides respectively of the intermediate cross member 25. A pivot pin 31 extending through an aperture in the cross member 25 centrally of the length and width of this cross member and through apertures disposed adjacent the upper ends of the lugs 29 and 30 pivotally mounts the rear end of the frame on the rear axle 28 for rocking movement of the rear end of the frame about an axis extending longitudinally of the frame and medially of the width thereof.

Rear wheels 32 and 33 are mounted on the respectively opposite ends of the rear axle 28 and support the rear end of the frame and tension springs 34 and 35 connected between the frame cross members 25 and 14 respectively and the rear axle 28 at locations spaced from the opposite sides of the pivotal mounting provided by the lugs 29 and 30 resiliently resist and curb rocking movement of the frame relative to the rear axle, and also act to control and adjust the level of the rear cross member 14.

A hopper supporting frame 36 is mounted on the rear end of the frame 10 and includes a pair of spaced apart and substantially parallel standards 37 and 38 projecting perpendicularly upward from the main frame side member 12, a pair of similar standards, one of which is indicated at 39, projecting perpendicularly upward from the main frame side member 11, a rail 40 extending across and projecting beyond the top ends of the standards 37 and 38 and disposed substantially parallel to the side member 12, a rail 41 extending across and beyond the top ends of the standards projecting upwardly from the side member 11, a diagonal brace 43 inclined downwardly and forwardly from the front end of the rail 40 to the side member 12 intermediate the length of the latter and a corresponding brace inclined downwardly and forwardly from the front end of the rail 41 to the side member 11 intermediate the length of this side member.

A shaft 44 extends through the rear ends of the rails 40 and 41 and is disposed above and parallel to the rear cross member 14 of the main frame and a trough shaped hopper 45, having an open top of rectangular shape, has its rear edge extending along and secured to the shaft 44 between the rails 40 and 41. At its ends the hopper is provided with outwardly extending flanges 46 and 47 which rest upon the top edges of the rails 40 and 41 respectively to support the hopper with its top side in substantially horizontal position and parallel to the plane of the main frame 10.

Brackets 50 and 51 are secured to and depend from the intermediate cross member 25 at locations equally spaced to opposite sides of the pivotal connection 31 and pressure fluid operated, expansible chamber devices 52 and 53 are disposed in substantially upright position and connected between the brackets 50 and 51 respectively and the hopper 45 at locations spaced forwardly from the rear end of the hopper. The expansible chamber devices 52 and 53 may comprise hydraulic cylinders each having a piston reciprocably movable therein and a connecting rod secured at one end to the piston and projecting outwardly of the open end of the associated cylinder. The device 52 is pivotally connected at its lower end to the bottom end of the bracket 50 by the pivotal connection 54 and is connected at its upper end to the hopper 45 by a bracket 55 and pivotal connection 56. The expansible chamber device 53 is pivotally connected at its lower end to the bottom end of the bracket 51 by a pivotal connection 57 and at its upper end to the hopper by a bracket 58 and pivotal connection 59, the arrangement being such that when the devices 52 and 53 are elongated by the admission of fluid under pressure into the lower ends of the cylinder portions of these devices the hopper will be raised to move its open top side from a substantially horizontal position to a substantially vertical position extending upwardly from the shaft 44 at the rear end of the machine frame to dump stones from the hopper rearwardly of the machine, as illustrated in Figure 2.

The scoop assembly, generally indicated at 60, comprises a rectangular scoop frame 61 having a rear side member 62 extending transversely of the machine frame forwardly of the intermediate cross member 25 of the machine frame and pivotally mounted at its ends on brackets, as indicated at 63, extending upwardly from the side members 11 and 12 of the machine frame. The scoop frame further includes a front side member 64 spaced from and parallel to the rear side member 62, end members 65 and 66 extending perpendicularly between the rear and front side members and secured to these side members at the corresponding ends of the scoop frame, an intermediate cross member 67 extending between the rear and front side members medially of the length of the scoop frame and diagonal braces 68 and 69 extending across the rear corners of the frame. It is here pointed out that tension springs 34 and 35 also serve to resiliently control and adjust the level of the front side bar 64 since the hydraulic cylinders 52 and 53 are carried at one end by the cross member 25 and the cross member 25 has a resilient relation to the springs.

The scoop assembly also comprises a plurality of tines 70, preferably formed of resilient material, such as tempered steel, and each comprising an elongated rod tapered from a location intermediate the length thereof to one end. Each tine 70 is bent intermediate its length to an angle somewhat greater than 90°, as indicated at 71, and the tapered portion of each tine extends in one direction from the bend 71 therein while a shank portion of substantially uniform diameter extends in a different direction from the bent intermediate portion of the tine. The tapered portion of the tine 71 preferably comprises approximately two-thirds of the entire length of the tine while the shank comprises approximately one-third of the tine length.

The tines 70 are spaced apart along the front edge of the front side bar 64 of the frame 60 with the shank portions of the tines disposed perpendicular to the frame side or bar 64 at locations equally spaced apart along this bar and with the tapered portions of the tines extending forwardly from the front side member or bar 64 of the frame and disposed substantially parallel to each other. The shank portions of the tines are secured to the front side bar 64 of the frame 60 by U-bolt clamps 72 and the shank portions of the tines may be adjusted longitudinally relative to the corresponding U-bolt clamps to position the frame side bar 64 at a desired location longitudinally of the shank portions of the tines.

When the scoop is in operative position, as illustrated in full lines in Figure 2, the smaller or pointed ends of the tines 70 are disposed substantially in a straight line and rest on or slightly below the surface of the ground below and adjacent to the front cross member 13 of the main frame 10 of the machine. The tapered portions of the tines are inclined rearwardly and upwardly from the smaller front ends of the tines and the shank portions of the tines are inclined upwardly and rearwardly from the bends at which the tapered portions join the shank portions, since the bends 71 in each of the tines 70 are greater than 90°, and in practice a bend of about 103° has been found to be suitable, a pronounced slant of the tapered portion of each of the tines 70 with respect to the ground surface will result as clearly shown in Fig. 2. The longitudinal center lines of all of the tines are disposed substantially in corresponding planes which are disposed in uniformly spaced apart and parallel relationship to each other and perpendicular to the plane of the main frame 10 of the machine and to the end members 13 and 14 of this main frame.

Brackets, defined by flat, generally rectangular plates 75, are mounted one on the main frame side member 11 and one on the main frame side member 12 near the mid-length locations of these main frame side members. Each bracket has a pair of spaced, longitudinally aligned, closed slots 90 extending longitudinally of the plate 75. A pair of bolts 92 pass through suitably formed openings in the respective frame side members and through respective ones of the slots 90 so as to secure the plate in a selected position longitudinally of the associated side frame member. Struts, defined by the depending arms indicated at 72, are fixedly carried by respective ones of brackets 75 and depend below the corresponding main frame member. Each of the struts being longitudinally adjustable along with its corresponding bracket relative to the corresponding main frame side member. Each strut carries at its lower end an abutment member 77 which engages with the under edge of the adjacent end members 65 and 66 of the scoop frame 60 to limit downward movement of the scoop assembly to thereby control the depth at which the front ends of the scoop tines will operate below the ground surface. By adjusting the brackets and struts 76 longitudinally of the respective side frame members, the operating depth of the scoop can be suitably adjusted, since the point at which the end members 65 and 66 will engage the abutments or stops 77 will be selectively varied as the brackets are adjusted longitudinally of the frame, preferably, with the brackets in transverse alignment.

Lever arms, as indicated at 78, extend rearwardly and downwardly from the rear side member 62 of the scoop frame one near each end of this rear side member and brackets, as indicated at 79, are mounted on the rear cross member 14 and intermediate cross member 25 of the main frame 10 one near each side of the main frame. Expansible chamber devices operated by fluid under pressure, as indicated at 80 and 81 are disposed one near each side of the main frame 10 and connected between the corresponding lever arm 78 and bracket 79, these devices each preferably including a hydraulic cylinder, a piston reciprocable in the cylinder and a piston rod secured at one end of the piston and projecting outwardly of the open end of the cylinder and each such device is pivotally connected at its opposite end to the corresponding bracket 79 and lever arm 78.

When hydraulic fluid under pressure is admitted to the rear ends of the devices 80 and 81 to cause elongation of the devices the scoop assembly 60 will be tilted upwardly about the pivotal axis of the rear frame side member 62 from the ground engaging position illustrated in full lines in Figure 2 to the elevated position illustrated in broken lines in which any stones carried by the tine assembly of the scoop will be dumped rearwardly into the top side of the hopper 45. The load of the scoop can be transferred to the hopper whenever necessary and, when the hopper has been filled with stones, the machine can be pulled to a location at which the stones can be dumped from the hopper in the manner indicated above. It is contemplated that the expansible chamber devices 52, 53, 80 and 81 will be hydraulic cylinder and piston devices supplied with hydraulic fluid under pressure from the hydraulic system of the agricultural tractor used to pull the stone gathering machine. It will be understood that flexible tube connections will lead to valve controls and to hydraulic power means such as that normally provided on tractors where with this invention is adapted to be used, these tubes and valve controls being thought unnecessary to be represented in the drawings, as being well known to those familiar with the art.

Side plates, as indicated at 84, are mounted on the end tines of the tine assembly of the scoop and extend upwardly from the tapered portions of the end tines and forwardly from the shank portions of the tines to maintain the stones picked up by the tines on the tines until the tine assembly is dumped into the associated hopper in the manner described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A mobile stone gathering machine comprising a wheel supported frame, a hopper arranged above said frame, and pivotally connected thereto for movement from a stone receiving to a stone dumping position, and a scoop assembly engageable with a ground surface and pivotally connected to said frame for movement from a ground engageable position where it gathers stones to a position above said hopper where it deposits the gathered stones in said hopper.

2. A mobile stone gathering machine comprising a wheel supported frame, a hopper arranged above said frame in a stone receiving position and connected to said frame for movement in an arcuate path about a horizontal axis above and transversely of said frame adjacent one end thereof from a stone receiving to a stone dumping position, and a scoop assembly carried by said frame for movement in a vertical arcuate path about a horizontal axis lying in spaced parallel relation to said first horizontal axis from a lowered stone gathering position to a raised stone dumping position above and over said hopper to deposit the stones in said hopper.

3. A mobile stone gathering machine comprising a wheel supported frame, a hopper arranged above said frame in a stone receiving position and connected to said frame for movement in an arcuate path about a horizontal axis above and transversely of said frame adjacent one end thereof from a stone receiving to a stone dumping position, and a scoop assembly carried by said frame for movement in a vertical arcuate path about a horizontal axis lying in spaced parallel relation to said first horizontal axis from a lowered stone gathering position to a raised stone dumping position above and over said hopper to deposit the stones in said hopper, and means carried by said frame selectively adjustable longitudinally of the frame and extending therebelow for engagement by said scoop assembly to thereby control the depth at which said scoop assembly will engage the ground surface.

4. A mobile stone gathering machine comprising a wheel supported frame, a hopper arranged above said frame in a stone receiving position and connected to said frame for movement in an arcuate path about a horizontal axis above and transversely of said frame adjacent one end thereof from a stone receiving to a stone dumping position, and a scoop assembly carried by said frame for movement in a vertical arcuate path about a horizontal axis lying in spaced parallel relation to said first horizontal axis from a lowered stone gathering position to a raised stone dumping position above and over said hopper to deposit the stones in said hopper, and means carried by said frame selectively adjustable longitudinally of the frame and extending therebelow for engagement by said scoop assembly to thereby control the depth at which said scoop assembly will engage the ground surface, said means comprising brackets carried by said frame at opposite sides thereof for limited movement longitudinally of the frame to selectively adjusted positions, a depending strut carried adjacent one end by each of said brackets for movement therewith, an abutment member defining a stop carried by the other end of the strut for movement therewith and intercepting the path of movement of said scoop assembly in one direction remote from the stone dumping position to thereby control the depth at which said assembly will engage the ground surface as said brackets are moved to selected adjusted positions longitudinally of said frame.

5. A stone gathering machine comprising a wheel supported frame, a support structure carried by said frame adjacent one end thereof and extending upwardly therefrom, a hopper carried by said structure for movement about a horizontal axis above and transversely of said frame from a horizontal stone receiving position to a vertical stone dumping position, and a scoop assembly carried by said frame for movement about a horizontal axis disposed toward the end of said frame away from said one end and in spaced parallel relation to said first-mentioned horizontal axis for movement from a stone gathering ground engaging position to a position above said hopper so that stones can be deposited from said assembly into said hopper.

References Cited in the file of this patent

UNITED STATES PATENTS

| | | |
|---|---|---|
| 1,625,560 | Morris | Apr. 19, 1927 |
| 2,476,667 | Kendall | July 19, 1949 |
| 2,491,079 | Bestland | Dec. 13, 1949 |
| 2,523,263 | Anderson | Sept. 26, 1950 |
| 2,618,917 | Howser | Nov. 25, 1952 |
| 2,636,328 | Jochim | Apr. 28, 1953 |